United States Patent
Deshpande et al.

(10) Patent No.: US 8,391,873 B2
(45) Date of Patent: Mar. 5, 2013

(54) SYSTEMS AND METHODS FOR COORDINATING SUPPLEMENTARY SERVICES FOR VOICE TELEPHONE CALLS IN A CENTRALIZED FASHION

(75) Inventors: Manoj M. Deshpande, San Diego, CA (US); Arungundram C. Mahendran, San Diego, CA (US); Haipeng Jin, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 850 days.

(21) Appl. No.: 11/780,440

(22) Filed: Jul. 19, 2007

(65) Prior Publication Data

US 2008/0020776 A1 Jan. 24, 2008

Related U.S. Application Data

(60) Provisional application No. 60/832,568, filed on Jul. 21, 2006.

(51) Int. Cl.
*H04W 40/00* (2009.01)
(52) U.S. Cl. ........................ 455/445; 370/356
(58) Field of Classification Search .................. 455/445, 455/406, 414.1, 433; 370/356, 329, 331, 370/352, 354, 401
See application file for complete search history.

(56) References Cited

U.S. PATENT DOCUMENTS

| 5,504,804 | A  | * | 4/1996  | Widmark et al. | ............ 455/63.2 |
| 5,850,603 | A  |   | 12/1998 | Lantto et al. | |
| 6,487,196 | B1 | * | 11/2002 | Verthein et al. | ................ 370/352 |
| 7,200,385 | B1 | * | 4/2007  | Wallenius et al. | ......... 455/414.1 |
| 7,359,373 | B2 | * | 4/2008  | Kuusinen et al. | ............. 370/352 |
| 2001/0049263 | A1 | * | 12/2001 | Zhang | .......................... 455/67.1 |
| 2003/0027595 | A1 |   | 2/2003  | Ejzak | |
| 2003/0172171 | A1 | * | 9/2003  | Ueno | ............................ 709/230 |
| 2004/0072593 | A1 | * | 4/2004  | Robbins et al. | ................ 455/560 |
| 2004/0154043 | A1 | * | 8/2004  | Roman | ......................... 725/119 |

(Continued)

FOREIGN PATENT DOCUMENTS

| JP | 2004519927 A | 7/2004 |
| RU | 2273097 | 3/2006 |

(Continued)

OTHER PUBLICATIONS

3GPP SA WG2: "Voice Call Continuity between CS and IMS Study (3GPP TR 23.806 version 7.0.0 Release 7)" 3GPP TR 23.806 V7.0.0, XX, XX, Dec. 2005, pp. 1-153, XP002385067.
International Search Report—PCT/US07/074046, International Search Authority—European Patent Office—Feb. 6, 2008.

(Continued)

*Primary Examiner* — Jinsong Hu
*Assistant Examiner* — Nathan Taylor
(74) *Attorney, Agent, or Firm* — Kristine U. Ekwueme; Abdollah Katbab

(57) ABSTRACT

A mobile station that is configured to facilitate coordination of supplementary services in a centralized fashion may include circuit-switched (CS) domain components that are configured to place voice telephone calls in a CS domain. The mobile station may also include IP multimedia subsystem (IMS) components that are configured to place voice telephone calls in an IMS domain. The IMS components may include a transport component for facilitating communication with an IMS core network. The IMS components may also include a signaling component that is configured to exchange information with a centralized server on the IMS core network via the transport component. At least some of the information that is exchanged with the centralized server may be related to supplementary services for the voice telephone calls in the CS domain as well as the voice telephone calls in the IMS domain.

27 Claims, 11 Drawing Sheets

U.S. PATENT DOCUMENTS

| | | | |
|---|---|---|---|
| 2004/0203794 A1* | 10/2004 | Brown et al. | 455/445 |
| 2004/0253941 A1* | 12/2004 | Rivera et al. | 455/408 |
| 2005/0058125 A1* | 3/2005 | Mutikainen et al. | 370/354 |
| 2005/0124326 A1* | 6/2005 | Belkin et al. | 455/414.1 |
| 2006/0268904 A1* | 11/2006 | Bae et al. | 370/401 |
| 2007/0121608 A1* | 5/2007 | Gu et al. | 370/356 |
| 2007/0223370 A1* | 9/2007 | Spear | 370/218 |
| 2008/0072148 A1* | 3/2008 | Walter et al. | 715/700 |
| 2008/0117893 A1* | 5/2008 | Witzel et al. | 370/352 |

FOREIGN PATENT DOCUMENTS

| | | |
|---|---|---|
| RU | 2288540 C2 | 11/2006 |
| WO | WO9930512 A1 | 6/1999 |
| WO | WO03096578 A1 | 11/2003 |
| WO | WO2004025395 A2 | 3/2004 |
| WO | WO2005011244 A2 | 2/2005 |

OTHER PUBLICATIONS

Report on alternative architectures for combining CS bearers with IMS 3GPP TSG-SA Meeting #26, XX, XX, Dec. 13, 2004, page complete, XP002320984 p. 27-p. 31.

$3^{rd}$ Generation Partnership Project, Technical Specification Group Core Network, Mobile radio interface layer 3 Supplementary services specification; General aspects (Release 4, CWTS STD-DS-24. 010 (2002-V4) Technical Specification, pp. 1-31, Dec. 12, 2003, [retrieved on Oct. 31, 2011 ,from: http://ccsa,org.cn/ITU-spec/ITU-WM. 1457IM. 1457-2/DS-2701 O.doc].

Taiwan Search Report—TW096126663- TIPO—Mar. 18, 2012.

Written Opinion of the International Searching Authority, PCT/US07/074046, European Patent Office, Feb. 6, 2008.

* cited by examiner

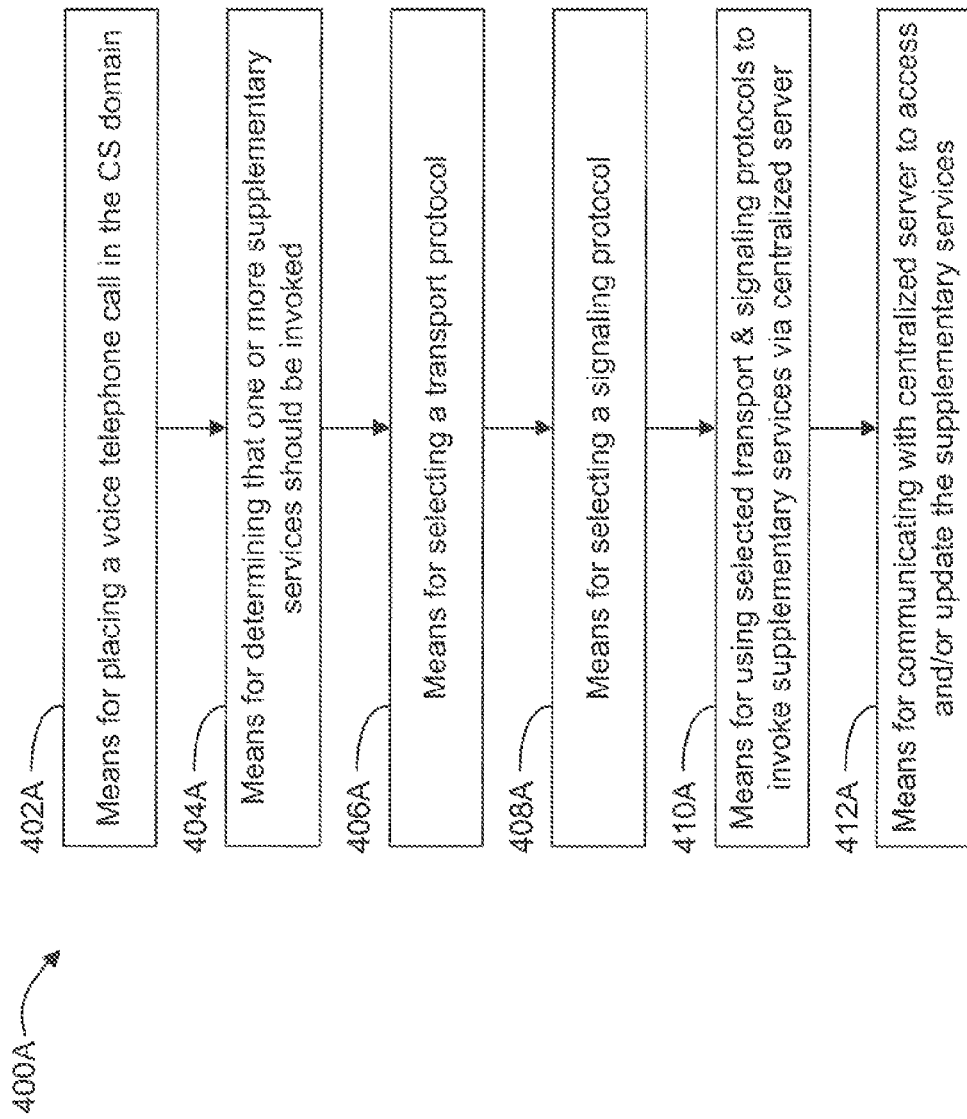

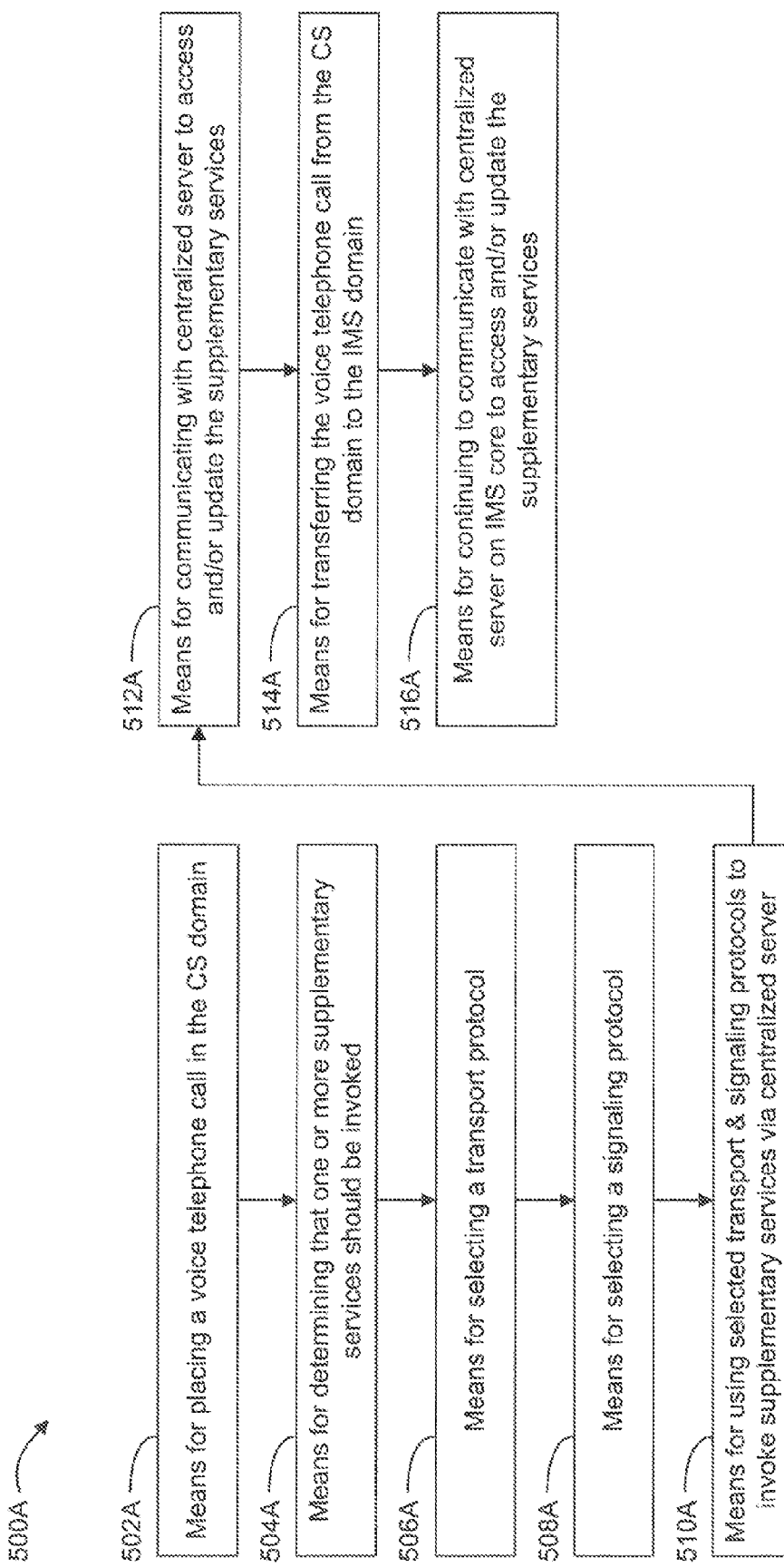

SYSTEMS AND METHODS FOR COORDINATING SUPPLEMENTARY SERVICES FOR VOICE TELEPHONE CALLS IN A CENTRALIZED FASHION

RELATED APPLICATIONS

This application is related to and claims priority from U.S. Patent Application Ser. No. 60/832,568 filed Jul. 21, 2006, for "Centralized Supplementary Services in the IMS Core," with inventors Manoj M. Deshpande, Arungundram C. Mahendran and Haipeng Jin, which is incorporated herein by reference.

TECHNICAL FIELD

The present disclosure relates generally to wireless communication systems. More specifically, the present disclosure relates to systems and methods for coordinating supplementary services for voice telephone calls in a centralized fashion.

BACKGROUND

Electronic devices can include multiple communication protocols. For example, mobile devices have become multi-functional devices, frequently providing email, Internet access, as well as traditional cellular communication. Mobile devices can be equipped with wide area wireless connectivity, for example, utilizing the following technologies: third generation wireless or cellular systems (3G), Institute for Electrical and Electronic Engineers (IEEE) 802.16 (WiMax), and other to-be-defined Wireless Wide Area Network (WWAN) technologies. Meanwhile, IEEE 802.11 based Wireless Local Area Network (WLAN) connectivity is being installed in mobile devices as well. On the horizon, ultra-wideband (UWB) and/or Bluetooth-based Wireless Personal Area Network (WPAN) local connectivity may also be available in mobile devices.

Other examples of multiple communication protocols in electronic devices include a laptop that may include a WPAN utilized to connect the laptop to a wireless mouse, wireless keyboard, and the like. In addition, the laptop may include an IEEE 802.11b or 802.11g device to allow the laptop to communicate with a WLAN. WLAN has become popular and, for example, is being set up in homes for both personal and business purposes. In addition, coffee shops, Internet cafes, libraries and public and private organizations utilize WLANs.

WWAN technologies are distinguished by wide area (ubiquitous) coverage and wide area deployments. However, they can suffer from building penetration losses, coverage holes and comparatively, to WLAN and WPAN, limited bandwidth. WLAN and WPAN technologies deliver very high data rates, approaching hundreds of Mbps, but coverage is typically limited to hundreds of feet in the case of WLAN and tens of feet in the case of WPAN.

The number of networks and protocols continues to increase rapidly due to demands for functionality associated with unique user demands and divergent protocols. In view of the foregoing, there is a need to provide for seamless transition between networks and/or protocols for optimizing and converging on the best communication protocol for the user.

BRIEF DESCRIPTION OF THE DRAWINGS

FIG. 4A illustrates means plus function blocks corresponding to the method shown in FIG. 4;

FIG. 5A illustrates means plus function blocks corresponding to the method shown in FIG. 5;

DETAILED DESCRIPTION

Figure 1:
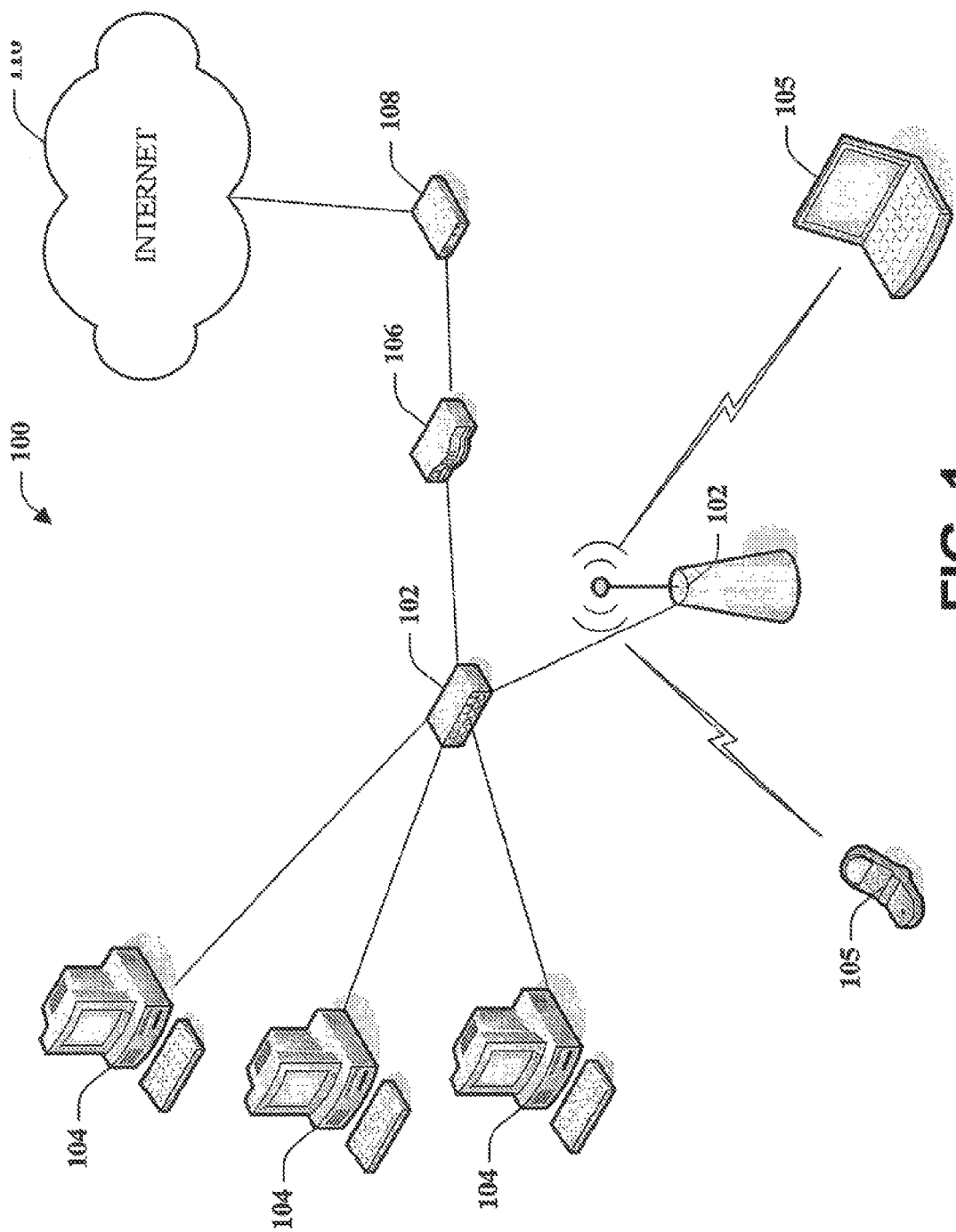
FIG. 1 is an illustration of a multiple access wireless communication system.

A mobile station that is configured to facilitate coordination of supplementary services in a centralized fashion is disclosed. The mobile station may include circuit-switched (CS) domain components that are configured to place voice telephone calls in a CS domain. The mobile station may also include IP multimedia subsystem (IMS) components that are configured to place voice telephone calls in an IMS domain. The IMS components may include a transport component for facilitating communication with an IMS core network. The IMS components may also include a signaling component that is configured to exchange information with a centralized server on the IMS core network via the transport component. At least some of the information that is exchanged with the centralized server may be related to supplementary services for the voice telephone calls in the CS domain as well as the voice telephone calls in the IMS domain.

The mobile station may be configured to place a voice telephone call in the CS domain. The mobile station may also be configured to invoke a supplementary service via the centralized server on the IMS core network. The mobile station may also be configured to communicate with the centralized server to access and/or update the supplementary service while the voice telephone call is in the CS domain.

The mobile station may also be configured to select a transport protocol and a signaling protocol that may be used to communicate with the centralized server. The selected transport protocol and the selected signaling protocol may be used to invoke the supplementary service and to access and/or update the supplementary service.

The mobile station may also be configured to transfer the voice telephone call from the CS domain to the IMS domain. After the voice telephone call has been transferred to the IMS domain, the mobile station may also be configured to continue to communicate with the centralized server on the IMS core network to access and/or update the supplementary service.

The mobile station may be configured to place a voice telephone call in the IMS domain. The mobile station may also be configured to invoke a supplementary service via the centralized server on the IMS core network. The mobile station may also be configured to transfer the voice telephone call from the IMS domain to the CS domain. The mobile station may also be configured to continue to communicate with the centralized server on the IMS core network to access and/or update the supplementary service after the voice telephone call has been transferred to the CS domain.

The transport component may implement a packet switched transport protocol. Communication with the centralized server may occur via the packet switched transport protocol.

The transport component may implement a data burst message protocol. Communication with the centralized server may occur via the data burst message protocol.

The transport component may implement a short message service protocol. Communication with the centralized server may occur via the short message service protocol.

The transport component may implement a dual tone multi frequency protocol. Communication with the centralized server may occur via the dual tone multi frequency protocol.

The transport component may implement a dialed digits suffix protocol. Communication with the centralized server may occur via the dialed digits suffix protocol.

The transport component may implement an unstructured supplementary services data protocol. Communication with the centralized server may occur via the unstructured supplementary services data protocol.

The signaling component may be configured to send a signaling message to the centralized server. The signaling message may include a service identifier field that identifies a supplementary service to be invoked. The signaling message may also include data that is specific to the invoked supplementary service. The signaling message may also include a field that indicates continuation of dialogue to exchange further data that is specific to the invoked supplementary service.

The mobile station may also include an encoding/decoding component. The encoding/decoding component may be configured to encode information that is sent from the mobile station to the centralized server. The encoding/decoding component may also be configured to decode information that is sent from the centralized server to the mobile station.

A centralized server that is part of an IP multimedia subsystem (IMS) core network and that is configured to coordinate supplementary services for voice telephone calls is also disclosed. The centralized server may include a transport component for facilitating communication with a mobile station when the mobile station is attached to an IMS domain or to a circuit-switched (CS) domain. The centralized server may also include a signaling component that is configured to exchange information with the mobile station via the transport component. The information that is exchanged with the mobile station may be related to supplementary services for voice telephone calls involving the mobile station when the mobile station is attached to the IMS domain or to the CS domain.

The centralized server may be configured to store information about the supplementary services. The information may include IMS domain-related information which corresponds to the voice telephone calls in the IMS domain. The information may also include CS domain-related information which corresponds to the voice telephone calls in the CS domain.

A mobile station that is configured to facilitate coordination of supplementary services in a centralized fashion is also disclosed. The mobile station may include means for placing voice telephone calls in a CS domain. The mobile station may also include means for placing voice telephone calls in an IMS domain. The mobile station may also include means for exchanging information with a centralized server on an IMS core network. At least some of the information that is exchanged with the centralized server may be related to supplementary services for the voice telephone calls in the CS domain as well as the voice telephone calls in the IMS domain.

The mobile station may also include means for invoking a supplementary service via the centralized server on the IMS core network. The supplementary service may correspond to a voice telephone call in the CS domain. The mobile station may also include means for communicating with the centralized server to access and/or update the supplementary service while the voice telephone call is in the CS domain.

The mobile station may also include means for selecting a transport protocol and a signaling protocol that may be used to communicate with the centralized server. The selected transport protocol and the selected signaling protocol may be used to invoke the supplementary service and to access and/or update the supplementary service.

The mobile station may also include means for transferring the voice telephone call from the CS domain to the IMS domain. The mobile station may also include means for continuing to communicate with the centralized server on the IMS core network to access and/or update the supplementary service after the voice telephone call has been transferred to the IMS domain.

The mobile station may include means for placing a voice telephone call in the IMS domain. The mobile station may also include means for invoking a supplementary service via the centralized server on the IMS core network. The mobile station may also include means for transferring the voice telephone call from the IMS domain to the CS domain. The mobile station may also include means for continuing to communicate with the centralized server on the IMS core network to access and/or update the supplementary service after the voice telephone call has been transferred to the CS domain.

A computer program product comprising a computer-readable medium is also disclosed. The computer-readable medium may comprise code for causing a mobile station to place voice telephone calls in a CS domain. The computer-readable medium may also comprise code for causing the mobile station to place voice telephone calls in an IMS domain. The computer-readable medium may also comprise code for causing the mobile station to exchange information with a centralized server on an IMS core network. At least some of the information that is exchanged with the centralized server may be related to supplementary services for the voice telephone calls in the CS domain as well as the voice telephone calls in the IMS domain.

The computer-readable medium may also comprise code for causing the mobile station to invoke a supplementary service via the centralized server on the IMS core network. The supplementary service may correspond to a voice telephone call in the CS domain. The computer-readable medium may also comprise code for causing the mobile station to communicate with the centralized server to access and/or update the supplementary service while the voice telephone call is in the CS domain.

The computer-readable medium may also comprise code for causing the mobile station to select a transport protocol and a signaling protocol that may be used to communicate with the centralized server. The selected transport protocol and the selected signaling protocol may be used to invoke the supplementary service and to access and/or update the supplementary service.

The computer-readable medium may also comprise code for causing the mobile station to transfer the voice telephone call from the CS domain to the IMS domain. The computer-readable medium may also comprise code for causing the mobile station to continue to communicate with the centralized server on the IMS core network to access and/or update the supplementary service after the voice telephone call has been transferred to the IMS domain.

The computer-readable medium may also comprise code for causing the mobile station to place a voice telephone call in the IMS domain. The computer-readable medium may also comprise code for causing the mobile station to invoke a supplementary service via the centralized server on the IMS core network. The computer-readable medium may also comprise code for causing the mobile station to transfer the voice telephone call from the IMS domain to the CS domain. The computer-readable medium may also comprise code for causing the mobile station to continue to communicate with the centralized server on the IMS core network to access and/or update the supplementary service after the voice telephone call has been transferred to the CS domain.

A computer program product comprising a computer-readable medium is disclosed. The computer-readable medium may comprise code for causing a centralized server in an IP multimedia system (IMS) core network to facilitate communication with a mobile station when the mobile station is attached to an IMS domain or to a circuit-switched (CS) domain. The computer-readable medium may also comprise code for causing the centralized server to exchange information with the mobile station. The information may be related to supplementary services for voice telephone calls involving the mobile station when the mobile station is attached to the IMS domain or to the CS domain.

Several exemplary embodiments are now described with reference to the Figures. This detailed description of several exemplary embodiments, as illustrated in the Figures, is not intended to limit the scope of the claims.

The word "exemplary" is used exclusively herein to mean "serving as an example, instance or illustration." Any embodiment described as "exemplary" is not necessarily to be construed as preferred or advantageous over other embodiments.

As used herein, the terms "an embodiment," "embodiment," "embodiments," "the embodiment," "the embodiments," "one or more embodiments," "some embodiments," "certain embodiments," "one embodiment," "another embodiment" and the like mean "one or more (but not necessarily all) embodiments," unless expressly specified otherwise.

The term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

FIG. 1 is an illustration of a multiple access wireless communication system 100. Illustrated is a system 100 that includes a WLAN associated with a wired local area network (LAN). An access point 102 can be in communication with one or more mobile devices 105. The access point (AP) 102 may be connected to an Ethernet hub or switch 102 for a LAN. The ethernet hub 102 may be connected to one or more electronic devices 104 that can include personal computers, peripheral devices (e.g., facsimile machines, copiers, printers, scanners, etc.), servers, and the like. The ethernet hub 102 can be connected to a router 106 that transmits data packets to a modem 108. The modem 108 can transmit data packets to a wide area network (WAN) 110, such as the Internet. The system 100 illustrates a single, simple network configuration. Many additional configurations of the system 100 including alternative electronic devices are possible. Although the system 100 has been illustrated and described with reference to a LAN, it is possible that the system 100 can utilize other technologies including WWAN and/or WPAN either separately or concurrently.

The system 100 can facilitate a mobile device 105 seamlessly switching between an access point currently being utilized by the mobile device 105 to the access point 102 associated with the system 100. Such transfer to the access point 102 and to the network supported by the access point 102 can be selected to provide the user of the mobile device 105 a sought after functionality and can be a function of the mobile device 105 location or the data the user desires to access or upload to the mobile device 105. By way of example and not limitation, the wireless device can be coupled to electronic device(s) 104 to utilize the WWAN and/or WLAN functionality available through the electronic device(s) 104. Such a transition can be user initiated or performed autonomously by the system 100.

Figure 2:
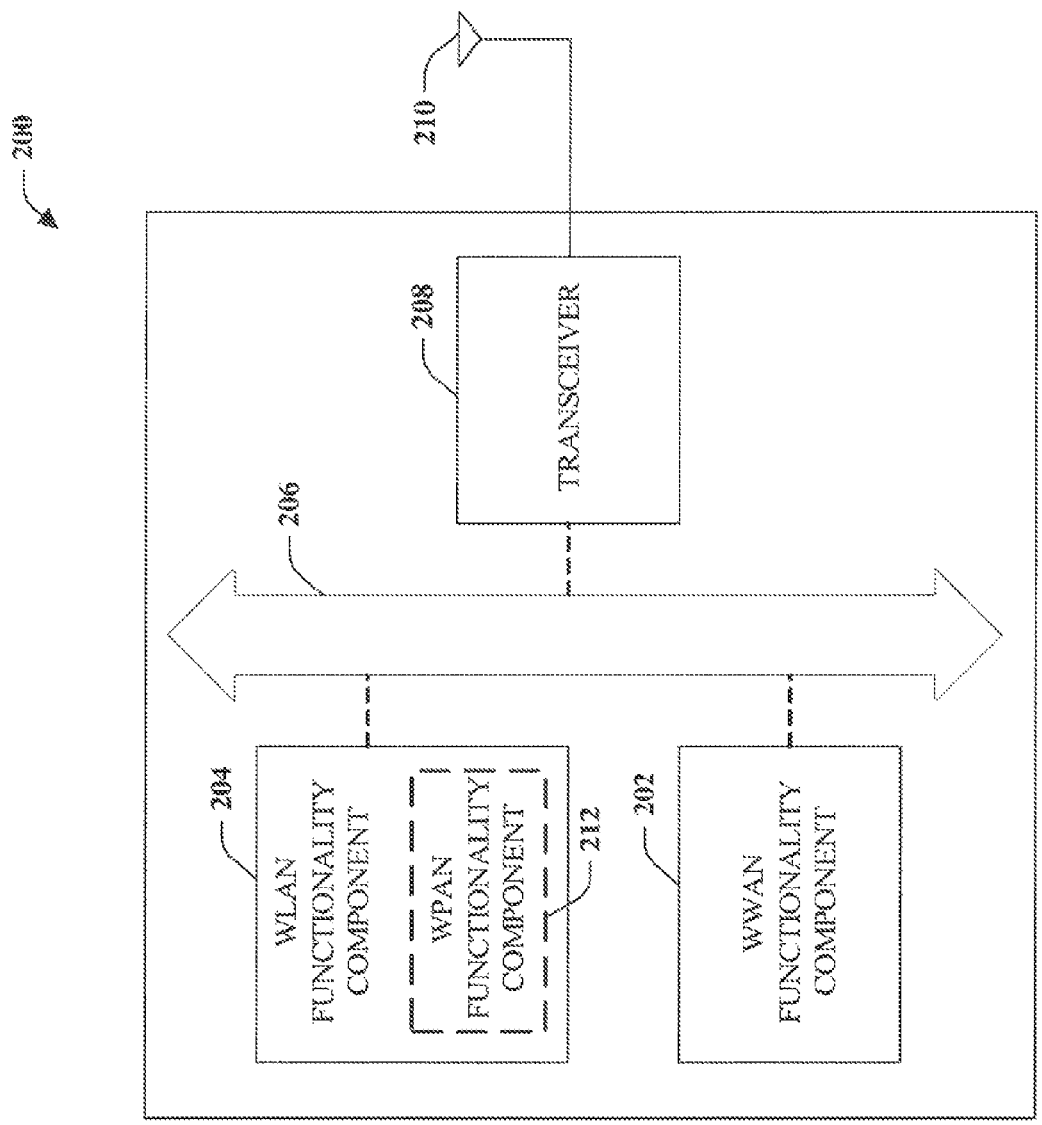
FIG. 2 illustrates a simplified block diagram of a mobile station.

FIG. 2 illustrates a simplified block diagram of a mobile station 200. The mobile station 200, also called a mobile device, can include WWAN (e.g., Code-Division Multiple Access (CDMA), Wideband Code-Vision Multiple Access (WCDMA), or Orthogonal Frequency Division Multiple Access (OFDMA)), WLAN (e.g., IEEE 802.11) and/or related technologies.

A WWAN component 202 that provides WWAN functionality and a WLAN component 204 that provides WLAN functionality may be located together and may be capable of communication with a transceiver 208 through a bus 206 or other structures or devices. It should be understood that communication means other than busses could be utilized. The transceiver 208 is shown coupled to one or more antennas 210 to allow transmission and/or reception by the mobile device 200. The WLAN component 204 can generate voice data provided to the transceiver 208 for communication. The WWAN functionality component 202 and/or the WLAN functionality component 204 can be included in a processor of the mobile device 200. Alternatively, the WWAN functionality and the WLAN functionality can be provided by distinct integrated circuits. Alternatively still, the WWAN functionality and the WLAN functionality can be provided by one or more integrated circuits, processors, ASICs, FPGAs, or the like, including combinations thereof. The mobile station 200 may be equipped with connectivity options for the wide area (WWAN) and local area (WLAN and WPAN) to allow a rich combination of services and user experiences.

The WLAN functionality component 204 can include an optional WPAN functionality component 212. The mobile station 200 can connect to either the WWAN or WLAN and WPAN, or to both simultaneously, based upon one or more criteria that relates to functions of the mobile station 200. Further, processes and criteria for switching between each of the networks and/or protocols may also be provided. The criteria can be stored in a memory of the mobile station 200 and a processor can analyze a network based on the stored criteria.

The mobile station 200 can be utilized as a Voice Over Internet Protocol (VoIP) phone. VoIP includes the transmission of voice telephone conversation through the Internet and/or through IP networks, and may be provided via the WLAN component 204. VoIP can be utilized by the mobile device 200 at home or when it is in vicinity of a wireless access point (WAP) connected to a broadband network that provides VoIP services. In other situations, the mobile station 200 can work as a regular wireless mobile phone while providing communication services.

With a vocoder such as G711, G723, G729, EVRC, SMV, 4GV, AMR, packets may be generated every 10 ms or 20 ms. Over WLAN the transmission time of each packet may depend on 802.11a/b/g versions and the congestion seen in the network. There may also be a lag time involved each time in turning on/off the transceiver 208.

The IP multimedia subsystem (IMS) is an architectural framework, originally designed by the 3rd Generation Partnership Project (3GPP), for delivering IP multimedia services to end users. The IMS as far as possible utilizes Internet Engineering Task Force (IETF) protocols.

A wireless communication network may be logically divided into a core network and an access network infrastructure. The core network infrastructure may be logically divided into a circuit-switched (CS) domain, a packet-switched (PS) domain, and an IMS domain.

The CS domain includes the core network components offering CS-type connections for user traffic as well as the components supporting the related signaling. A CS-type connection is a connection for which dedicated network resources are allocated at the connection establishment and released at the connection release.

The PS domain includes the core network components offering PS-type connections for user traffic as well as the components supporting the related signaling. A PS-type connection transports the user information using autonomous concatenation of bits called packets, wherein each packet can be routed independently from the previous one. The IMS domain includes core network components that function to provide IP multimedia services (e.g., audio, video, text, chat, etc.) delivered over the PS domain.

Voice Call Continuity (VCC) is the name given to procedures allowing a mobile subscriber to perform inter-technology handoff between VoIP sessions in the IMS domain and voice calls in the CS domain. Thus, VCC allows for seamless handoff for an ongoing voice call across different domains.

In certain aspects, the present disclosure provides a method for supporting centralized supplementary services in the IMS core, independent of the present access network used by the mobile station, and for supporting seamless call continuity across access networks for calls involved in supplementary services.

Common supplementary services include call hold, call waiting, multiparty call, etc. Conventionally, supplementary services invoked in the CS domain are managed in the CS domain, whereas supplementary services invoked in the IMS domain are managed in the IMS domain. That is, the CS domain provides the supplementary services invoked by the mobile station while in CS coverage, while the IMS domain provides the supplementary services invoked by the mobile station while in IMS coverage. With known approaches, the CS domain and the IMS domain do not exchange state of invoked supplementary services. As a result, when a mobile station involved in one or more supplementary services performs a handover between the CS domain and the IMS domain, the mobile station may not be able to control or manage the supplementary services invoked in the previous domain. The calls involved in the supplementary services may then dangle or get lost.

The present disclosure provides a method to coordinate supplementary services in a centralized fashion in an IMS core, independent of whether the mobile station invoked the supplementary services in the CS domain or in the IMS domain. This disclosure may facilitate seamless handover of calls involved in supplementary services between the CS domain and the IMS domain without artifacts such as dangling calls or dropped calls. This disclosure may also facilitate fast real time control to the mobile station to manage the supplementary services.

Figure 3:
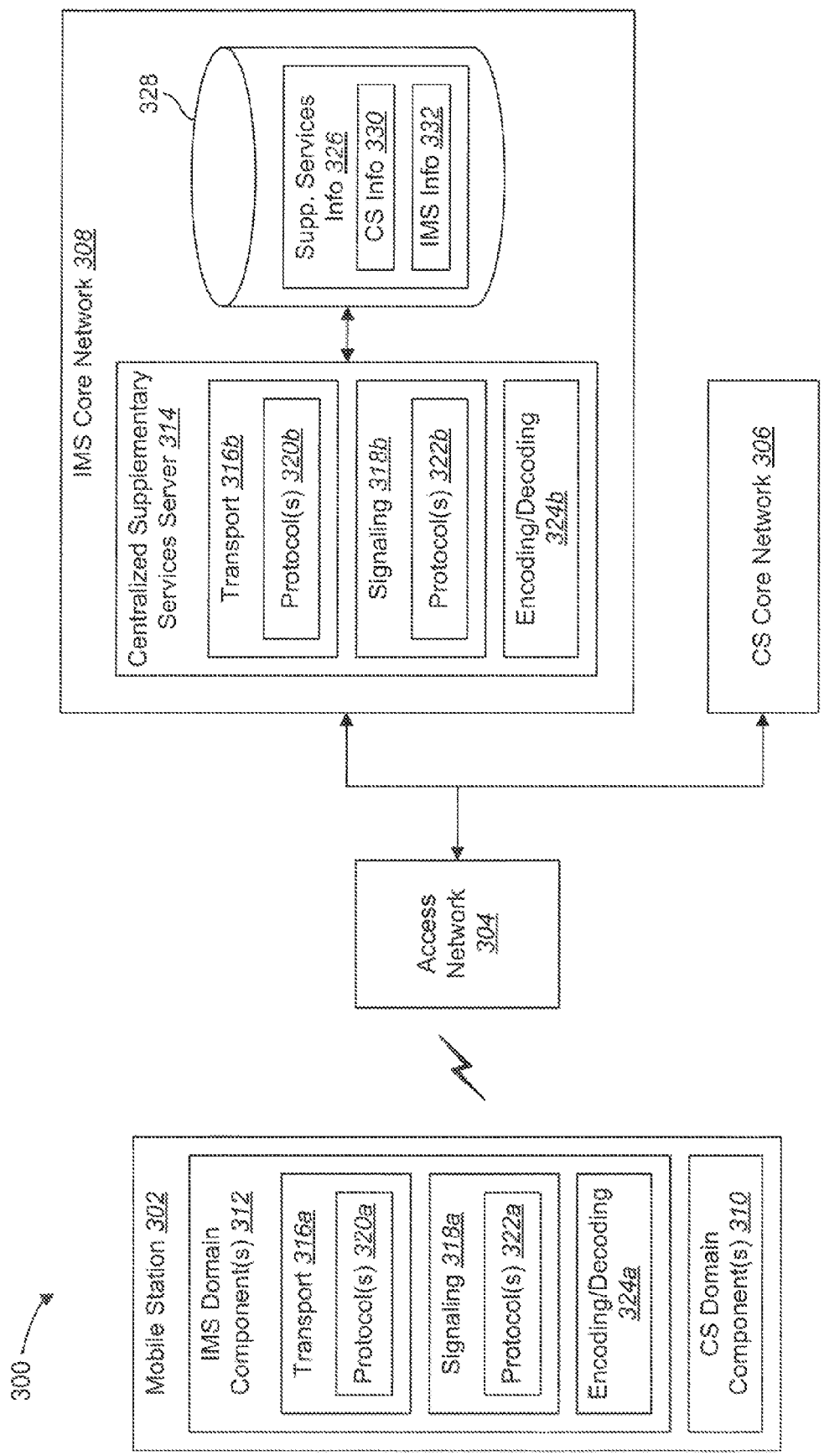
FIG. 3 illustrates an embodiment of a system for coordinating supplementary services in a centralized fashion.

FIG. 3 illustrates an embodiment of a system 300 for coordinating supplementary services in a centralized fashion. A mobile station 302 is shown. The mobile station 302 may utilize an access network 304 to connect with a CS core network 306 and/or an IMS core network 308. The mobile station 302 is shown with CS domain components 310 and IMS domain components 312. The CS domain components 310 may be used to place a voice telephone call in the CS domain, e.g., using a CS-type connection via the CS core network 306. The IMS domain components 312 may be used to place a voice telephone call in the IMS domain, e.g., using the Voice Over Internet Protocol (VoIP) via the IMS core network 308.

The IMS core network 308 is shown with a centralized supplementary services server (centralized server) 314. When the mobile station 302 places a voice telephone call, either a CS-domain call or an IMS-domain call, the centralized server 314 may be used to manage the supplementary services that are used during the call. Thus, even when the mobile station 302 is involved in a voice telephone call in the CS domain, the centralized server 314 on the IMS core network 308 may be used to manage the supplementary services that are used during the call.

Current IMS implementations use a server that is referred to as the VCC application server. The VCC application server may be modified so that it can function as the centralized server 314 described herein. Alternatively, the centralized server 314 may be implemented separately from the VCC application server.

As part of managing the supplementary services used by the mobile station 302, the centralized server 314 may communicate with the mobile station 302 using a transport protocol and a signaling protocol that are supported by both the centralized server 314 and the mobile station 302. FIG. 3 shows the IMS domain components 312 of the mobile station 302 as including a transport component 316a and a signaling component 318a. The transport component 316a is shown with implementations of one or more transport protocols 320a, and the signaling component 318a is shown with implementations of one or more signaling protocols 322a.

FIG. 3 also shows the centralized server 314 as including a transport component 316b and a signaling component 318b. The transport component 316b is shown with implementations of one or more transport protocols 320b, and the signaling component 318b is shown with implementations of one or more signaling protocols 322b.

The transport components 316a, 316b on the mobile station 302 and the centralized server 314 may provide means of communication between the mobile station 302 and the IMS core network 308. The signaling components 318a, 318b on the mobile station 302 and the centralized server 314 may define the exchange of information utilizing the underlying transport protocol 320 to manage the supplementary services. There may be at least one transport protocol 320 and at least one signaling protocol 322 that are implemented by both the centralized server 314 and the mobile station 302.

Using a suitable transport protocol 320 and a suitable signaling protocol 322, the mobile station 302 and the centralized server 314 may exchange information to centralize the management of supplementary services. Irrespective of the current attachment of the mobile station 302, the mobile station 302 may choose one of the supported transport protocols 320 and may exchange information with the centralized server 314 to invoke, access and update supplementary services in a voice telephone call in accordance with a suitable signaling protocol 322. This disclosure thus may facilitate seamless handover of voice telephone calls involved in supplementary services between the CS domain and the IMS domain.

FIG. 3 shows the mobile station 302 as including an encoding/decoding component 324a. FIG. 3 also shows the centralized server 314 as including an encoding/decoding component 324b. Information that is sent either by the mobile station 302 to the centralized server 314 or by the centralized server 314 to the mobile station 302 may be encoded on the sending side and then decoded on the receiving side. This may be done, for example, to reduce the required data rate when the transport protocol 320 that is being used has limited capacity. To encode the information the disclosure proposes the use of a standard dictionary to encode supplementary services as well as data specific to supplementary services. The encoding/decoding process may also be adaptive so that data encoded in the past can be used to encode subsequent data more efficiently.

The centralized server 314 may store information 326 about the supplementary services that are being managed. FIG. 3 shows this information 326 being stored in a database 328. The information 326 that is stored may include CS domain-related information 330 which corresponds to the voice telephone calls in the CS domain. The information 326 that is stored may also include IMS domain-related information 332 which corresponds to the voice telephone calls in the IMS domain.

In FIG. 3, the CS core network 306 and the IMS core network 308 are shown as separate networks. Alternatively, there may be some overlap between these networks 306, 308. For example, some components may be part of the CS core network 306 and also part of the IMS core network 308. In some implementations, the CS core network 306 and the IMS core network 308 may be referred to collectively as a single core network with a CS component (the CS core network 306) and an IMS component (the IMS core network 308).

Figure 4:
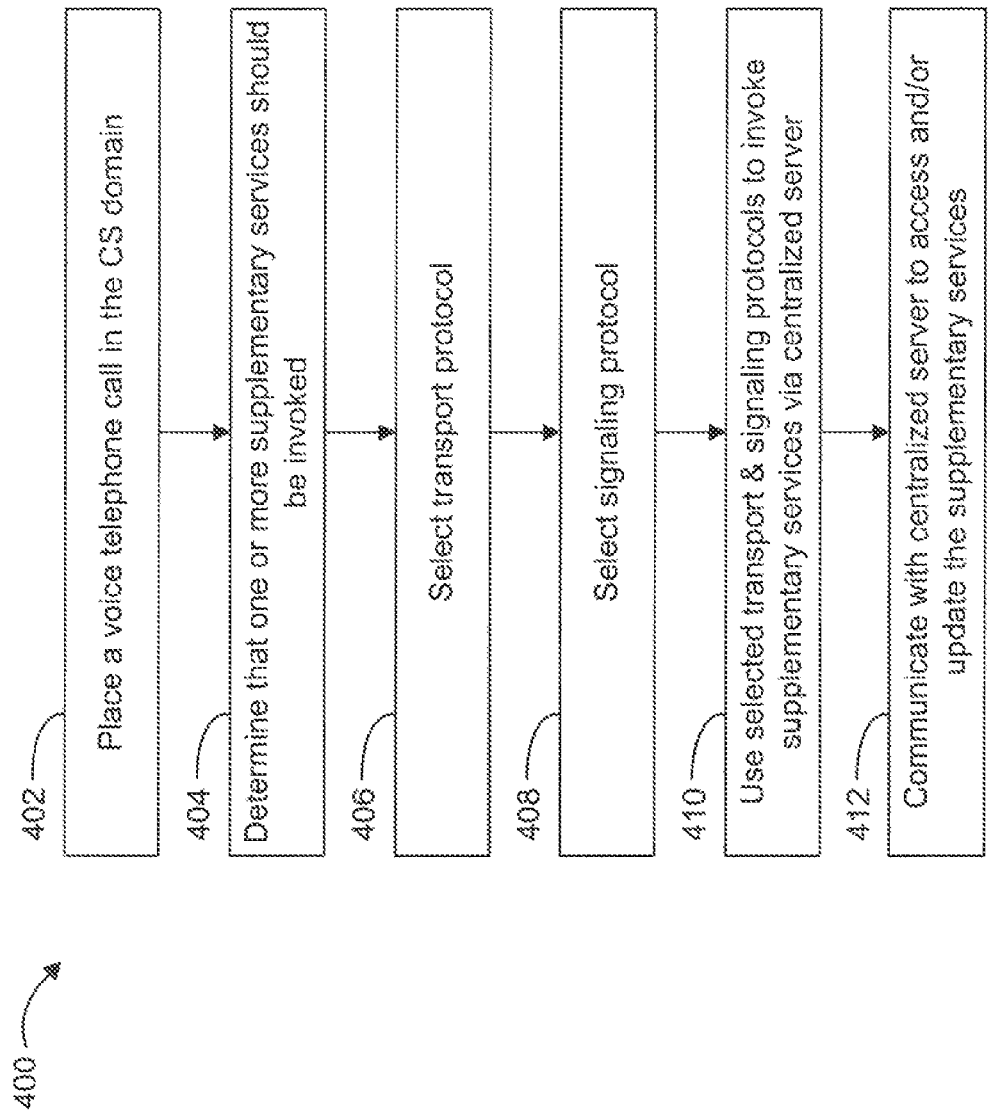
FIG. 4 illustrates some aspects of the operation of the mobile station in the system of FIG. 3.

FIG. 4 illustrates some aspects of the operation of the mobile station 302 in the system 300 of FIG. 3. In particular, the depicted method 400 illustrates how the mobile station 302 may be configured to operate during a voice telephone call in the CS domain (e.g., a voice telephone call using a CS-type connection via the CS core network 306).

In accordance with the depicted method 400, the mobile station 302 may place 402 a voice telephone call in the CS domain. At some point during the call, the mobile station 302 may determine 404 that one or more supplementary services should be invoked. For example, a user of the mobile station 302 may take some action that may be interpreted by the mobile station 302 as a request to invoke one or more supplementary services. The supplementary service(s) to be invoked will be referred to herein as the desired supplementary service(s).

In response to determining 404 that one or more supplementary services should be invoked, the mobile station 302 may select 406 a transport protocol 320 that may be used to communicate with the centralized server 314. The mobile station 302 may also select 408 a signaling protocol 322 that may be used to communicate with the centralized server 314. Once the transport protocol 320 and the signaling protocol 322 have been selected 406, 408, the mobile station 302 may then use the selected transport protocol 320 and the selected signaling protocol 322 to invoke 410 the desired supplementary service(s) via the centralized server 314. In other words, the mobile station 302 may communicate with the centralized server 314, using the selected transport protocol 320 and the selected signaling protocol 322, about invoking the desired supplementary service(s). Once the desired supplementary service(s) have been invoked 410, the mobile station 302 may then communicate 412 with the centralized server 314 to access and/or update the supplementary services, as needed, for the duration of the voice telephone call.

In another embodiment, the mobile station 302 may select 406 a transport protocol 320 and select 408 a signaling protocol 322 without being triggered by the determination 404 that one or more supplementary services should be invoked. For example, the mobile station 302 may select 406 a transport protocol 320 and select 408 a signaling protocol 322 in anticipation of the user invoking one or more supplementary services later. Once the transport protocol 320 and the signaling protocol 322 have been selected 406, 408, the mobile station 302 may then use the selected transport protocol 320 and the selected signaling protocol 322 to establish voice telephony calls via the centralized server 314. At some point during a call, the mobile station 302 may determine 404 that one or more supplementary services should be invoked. The mobile station 302 may then use the selected transport protocol 320 and the selected signaling protocol 322 to invoke 410 the desired supplementary service(s) via the centralized server 314. In other words, the mobile station 302 may communicate with the centralized server 314, using the selected transport protocol 320 and the selected signaling protocol 322, about invoking the desired supplementary service(s). Once the desired supplementary service(s) have been invoked 410, the mobile station 302 may then communicate 412 with the centralized server 314 to access and/or update the supplementary services, as needed, for the duration of the voice telephone call.

The method 400 of FIG. 4 described above may be performed by corresponding means plus function blocks 400A illustrated in FIG. 4A. In other words, blocks 402 through 412 illustrated in FIG. 4 correspond to means plus function blocks 402A through 412A illustrated in FIG. 4A.

Figure 5:
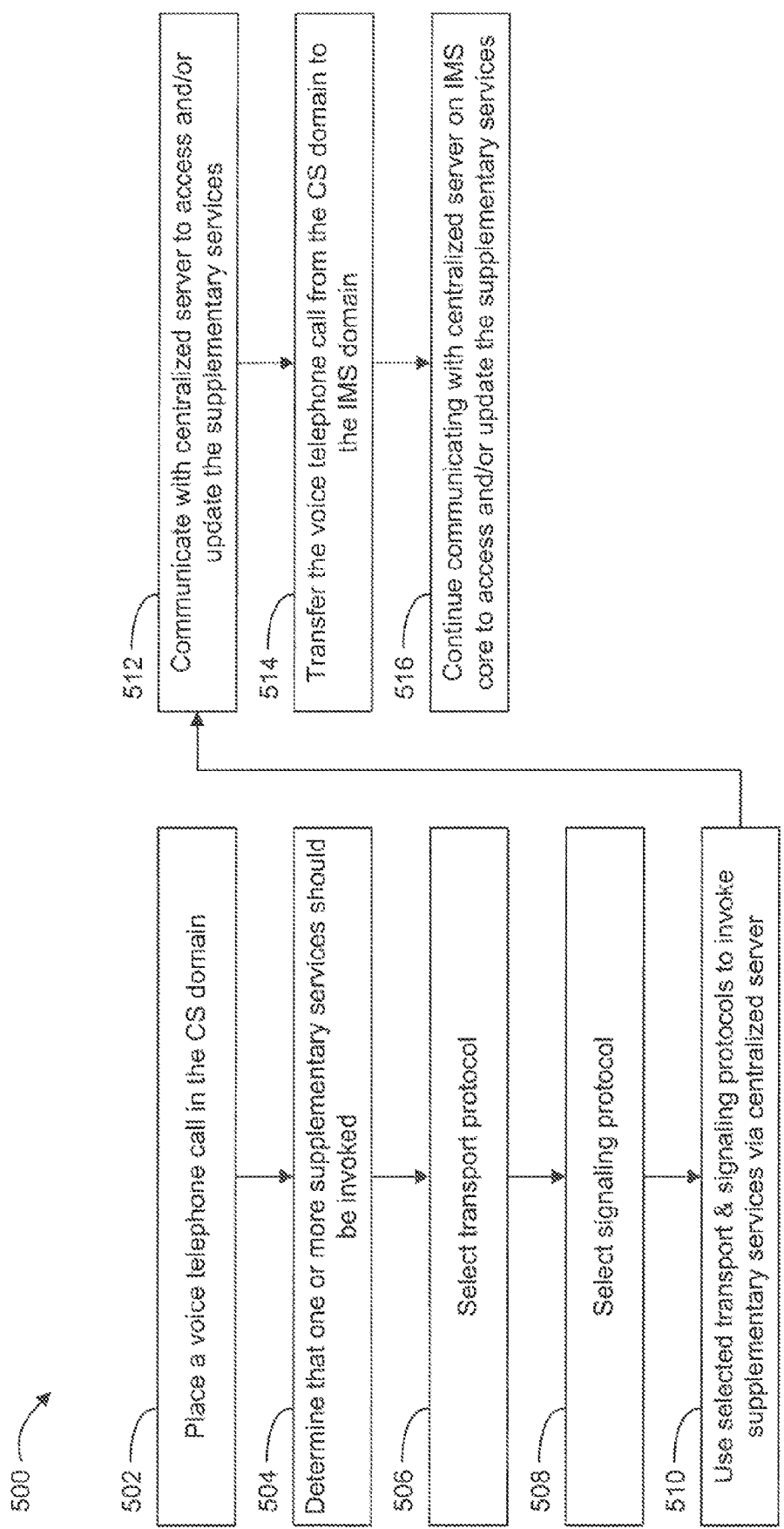
FIG. 5 illustrates some additional aspects of the operation of the mobile station in the system of FIG. 3.

FIG. 5 illustrates some additional aspects of the operation of the mobile station 302 in the system 300 of FIG. 3. In particular, the depicted method 500 illustrates how the mobile station 302 may be configured to operate when a voice telephone call in which the mobile station 302 is participating is transitioned from the CS domain to the IMS domain.

In accordance with the depicted method 500, the mobile station 302 may place 502 a voice telephone call in the CS domain (e.g., using a CS-type connection via the CS core network 306). At some point during the call, the mobile station 302 may determine 504 that one or more supplementary services should be invoked. In response, the mobile station 302 may select 506 a transport protocol 320 that may be used to communicate with the centralized server 314. The mobile station 302 may also select 508 a signaling protocol 322 that may be used to communicate with the centralized server 314. Once the transport protocol 320 and the signaling protocol 322 have been selected 506, 508, the mobile station 302 may then use the selected transport protocol 320 and the selected signaling protocol 322 to invoke 510 the desired supplementary service(s) via the centralized server 314. The mobile station 302 may then communicate 512 with the centralized server 314 to access and/or update the supplementary services, as needed. Thus, even though the mobile station 302 may be attached to the CS domain at this point in the method 500, the centralized server 314 on the IMS core network 308 may still be used to manage the supplementary services that are used during the call.

At some point, the mobile station 302 may transfer 514 the voice telephone call from the CS domain to the IMS domain. After the voice telephone call has been transferred 514 to the IMS domain, the mobile station 302 may continue to communicate 516 with the centralized server 314 on the IMS core network 308 to access and/or update the supplementary services, as needed, for the duration of the voice telephone call.

In another embodiment, the mobile station 302 may select 506 a transport protocol 320 and select 508 a signaling protocol 322 without being triggered by the determination 504 that one or more supplementary services should be invoked. For example, the mobile station 302 may select 506 a transport protocol 320 and select 508 a signaling protocol 322 in anticipation of the user invoking one or more supplementary services later. Once the transport protocol 320 and the signaling protocol 322 have been selected 506, 508, the mobile station 302 may then use the selected transport protocol 320 and the selected signaling protocol 322 to establish voice telephony calls via the centralized server 314. At some point during a call, the mobile station 302 may determine 504 that one or more supplementary services should be invoked. The mobile station 302 may then use the selected transport protocol 320 and the selected signaling protocol 322 to invoke 510 the desired supplementary service(s) via the centralized server 314. In other words, the mobile station 302 may communicate with the centralized server 314, using the selected transport protocol 320 and the selected signaling protocol 322, about invoking the desired supplementary service(s). Once the desired supplementary service(s) have been invoked 510, the mobile station 302 may then communicate 512 with the centralized server 314 to access and/or update the supplementary services, as needed.

The method 500 of FIG. 5 described above may be performed by corresponding means plus function blocks 500A illustrated in FIG. 5A. In other words, blocks 502 through 516 illustrated in FIG. 5 correspond to means plus function blocks 502A through 516A illustrated in FIG. 5A.

Figure 6:
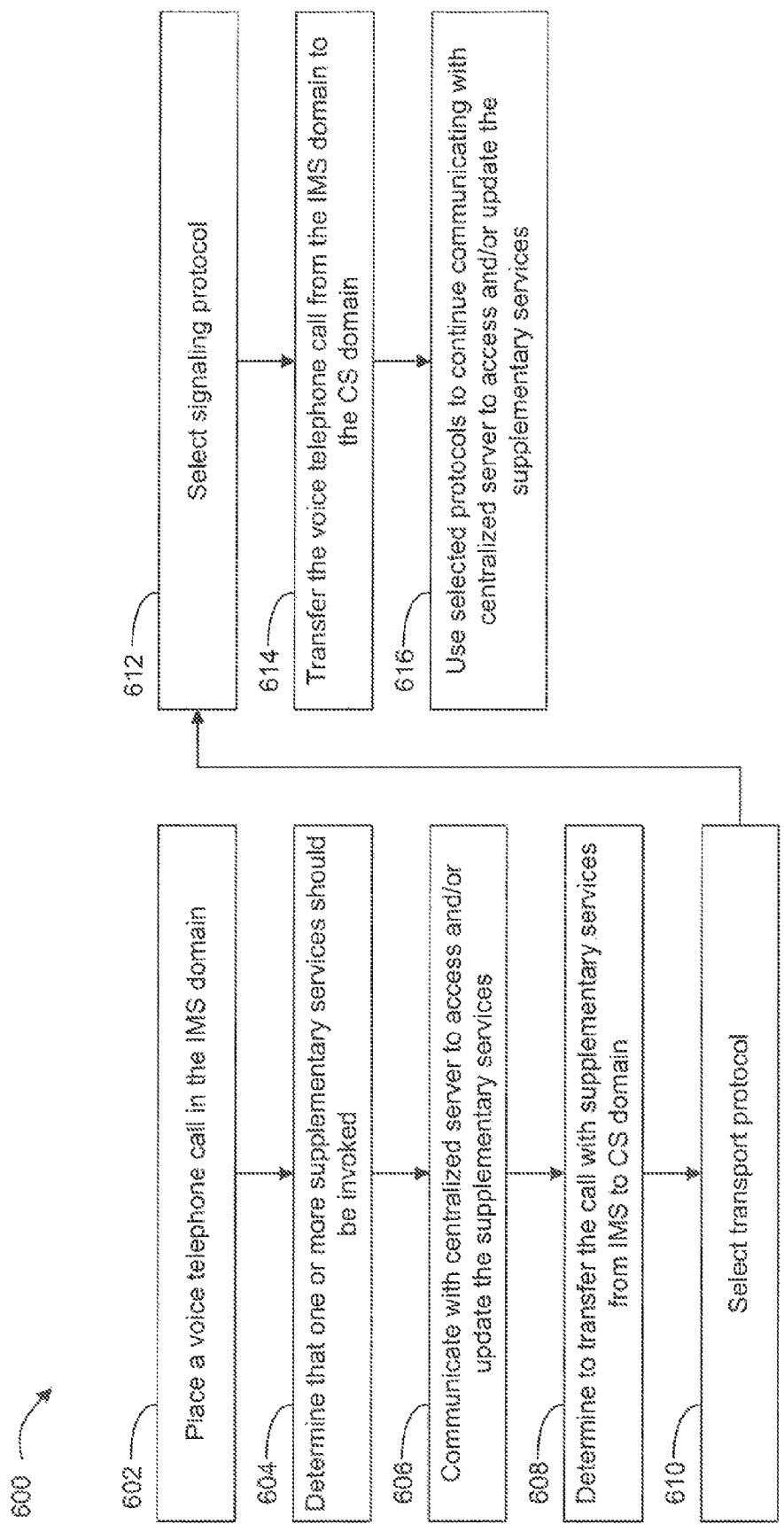
FIG. 6 illustrates some additional aspects of the operation of the mobile station in the system of FIG. 3.

FIG. 6 illustrates some additional aspects of the operation of the mobile station 302 in the system 300 of FIG. 3. In particular, the depicted method 600 illustrates how the mobile station 302 may be configured to operate when a voice telephone call in which the mobile station 302 is participating is transitioned from the IMS domain to the CS domain.

In accordance with the depicted method 600, the mobile station 302 may place 602 a voice telephone call in the IMS domain. At some point during the call, the mobile station 302 may determine 604 that one or more supplementary services should be invoked. The mobile station 302 may communicate 606 with the centralized server 314 to access and/or update the supplementary services, as needed.

At some point, the mobile station 302 may determine 608 to transfer the voice telephone call with the supplementary services from the IMS domain to the CS domain. In response, the mobile station 302 may select 610 a transport protocol 320 that may be used to communicate with the centralized server 314 from the CS domain. The mobile station 302 may also select 612 a signaling protocol 322 that may be used to communicate with the centralized server 314 from the CS domain. Once the voice telephone call has been transferred 614 from the IMS domain to the CS domain, the mobile station 302 may use 616 the selected transport and signaling protocols to continue communicating with the centralized server 314 to access and/or update the supplementary services, as needed.

Figure 6A:
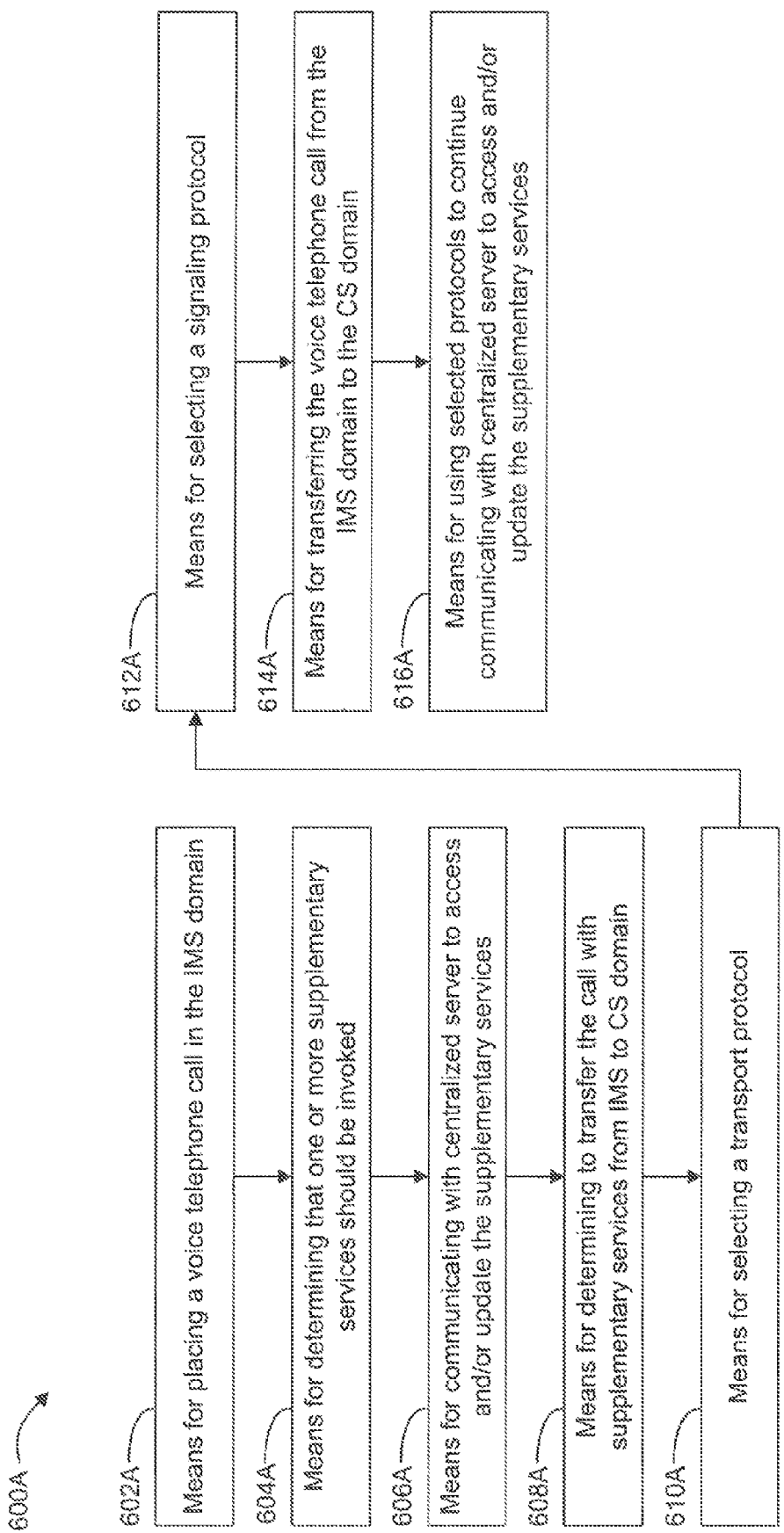
FIG. 6A illustrates means plus function blocks corresponding to the method shown in FIG. 6.

The method 600 of FIG. 6 described above may be performed by corresponding means plus function blocks 600A illustrated in FIG. 6A. In other words, blocks 602 through 616 illustrated in FIG. 6 correspond to means plus function blocks 602A through 616A illustrated in FIG. 6A.

Figure 7:
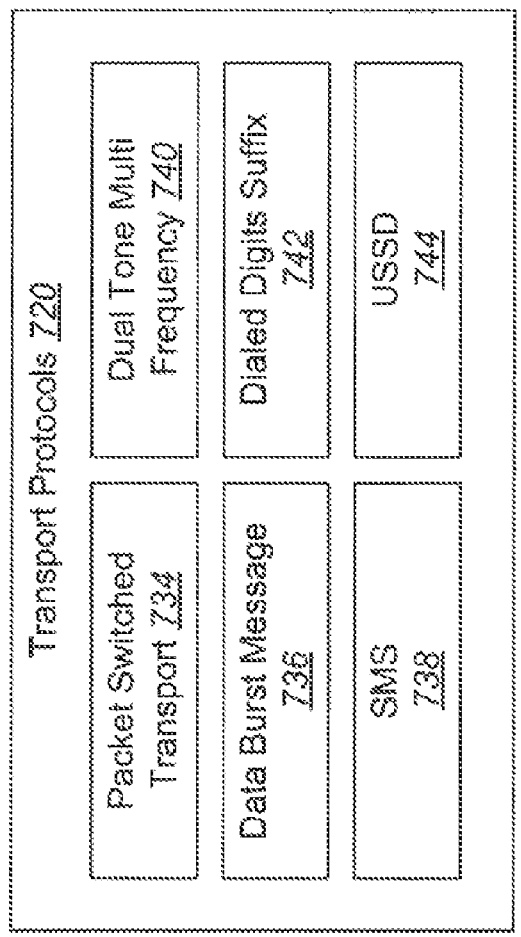
FIG. 7 illustrates various transport protocols that may be implemented by the mobile station and the centralized server in the system of FIG. 3.

As indicated above, the transport component 316a of the mobile station 302 in the system 300 of FIG. 3 is shown with implementations of one or more transport protocols 320a, and the transport component 316b of the centralized server 314 is also shown with implementations of one or more transport protocols 320b. FIG. 7 illustrates various transport protocols 720 that may be implemented by the mobile station 302 and the centralized server 314. The mobile station 302 and centralized server 314 may both implement one or more of the depicted transport protocols 720 in order to be able to exchange information to centralize the management of supplementary services, as described in the present disclosure.

The mobile station 302 and centralized server 314 may both implement a packet switched transport protocol 734. Some examples of packet switched transport protocols 734 include (but are not limited to) 3GPP packet data services such as HSPA, 3GPP2 packet data services such as EVDO or SCH, WiFi, WiMax, etc.

The mobile station 302 and centralized server 314 may both implement a data burst message protocol 736. When the mobile station 302 is attached to the CS domain, the mobile station 302 can use a special type of data burst message. The data burst message may transmitted by the mobile station 302 either to a base station or to a switch (e.g., a mobile switching center, or MSC). The base station or the switch may forward the data burst message to the centralized server 314. The data burst message may embed an IP datagram. The source address and the destination address of the IP datagram may correspond to the mobile station 302 and the centralized server 314, respectively. The base station or the switch may route the IP datagram using standard IP routing.

The mobile station 302 and centralized server 314 may both implement a short message service (SMS) protocol 738. The mobile station 302 may use an SMS protocol 738 implementation when it is attached to the CS domain or to the IMS domain. The traditional SMS may be slow for managing supplementary services interactively. Thus, the present disclosure proposes methods to route SMS messages in a fast fashion. The SMS messages used for this special transport may be identified by a special teletype or by a special destination address. Such messages may get preferential treatment while routing in the network. Such messages need not be stored in the network, as the centralized server 314 may be configured so that it is always available. This is different from the traditional SMS destined to the mobile stations (with traditional SMS, the mobile stations can be powered off or roaming and hence, for reliable transfer these messages may be stored until they may be delivered to the mobile stations).

The mobile station 302 and centralized server 314 may both implement a dual tone multi frequency (DTMF) protocol 740. The mobile station 302 may use a DTMF protocol 740 implementation when it is attached to the CS domain or to the IMS domain. The signaling protocol 322 may be encoded in the tones. These tones may be transmitted in band. Consider the transmission of the DTMF tones from the mobile station 302. The in band tones may bypass any treatment from the MSC and may reach the media gateway (MGW). The media gateway may decode the tones and pass the tones to the centralized server 314. The transport in the other direction from the centralized server 314 to the mobile station 302 may be similar.

The mobile station 302 and centralized server 314 may both implement a dialed digits suffix protocol 742. In accordance with a dialed digits suffix protocol 742, the mobile station 302 may append the encoded signaling as a suffix to the dialed digits during call origination to the centralized server 314. The CS core network 306 may pass on the prefix to the centralized server 314 during the call setup. The centralized server 314 may retrieve the suffix and translate that suffix to decode the signaling. The centralized server 314 need not continue with the call set up and need not set up any bearer. If the suffix of the dialed digits is not sufficient to carry the entire signaling information, the mobile station 302 may repeat the above origination process until all the information is delivered to the centralized server 314. If there is a need for transferring the signaling information from the centralized server 314 back to the mobile station 302, the centralized server 314 may employ a similar procedure. The centralized server 314 may set up a mobile terminated call. The signaling information may be encoded as a suffix to the mobile station 302 directory number. Alternatively, the signaling information can also be encoded as the source directory number. The above process can be repeated until all the information is delivered to the mobile station 302.

The mobile station 302 and centralized server 314 may both implement an unstructured supplementary services data (USSD) protocol 744. The mobile station 302 and the centralized server 314 may use the USSD protocol 744 as the transport to exchange signaling with each other.

Figure 8:
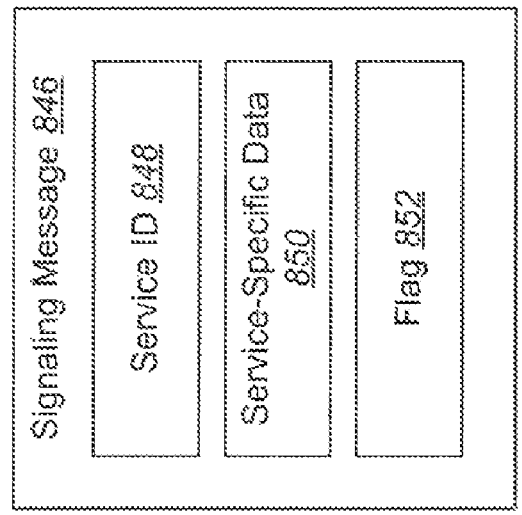
FIG. 8 illustrates a signaling message that may be sent from a mobile station to the centralized server, or vice versa.

FIG. 8 illustrates a signaling message 846 that may be sent from a mobile station 302 to the centralized server 314, or vice versa. The signaling message 846 is shown with a service identifier field 848. The service identifier field 848 may identify the invoked supplementary service. The signaling message 846 is also shown with service-specific data 850, i.e. data 850 that is specific to the invoked supplementary service. The signaling message 846 is also shown with a flag field 852 that indicates continuation of dialogue to exchange further data specific to the supplementary service. Other fields and/or techniques may be used, other than a flag field 852, to indicate continuation of dialogue to exchange further data specific to the supplementary service. Also, the signaling message 846 may include additional information beyond what is specifically shown in FIG. 8. As indicated above, the information that is included in a signaling message 846 may be encoded, or the information may be sent without encoding.

Figure 9:
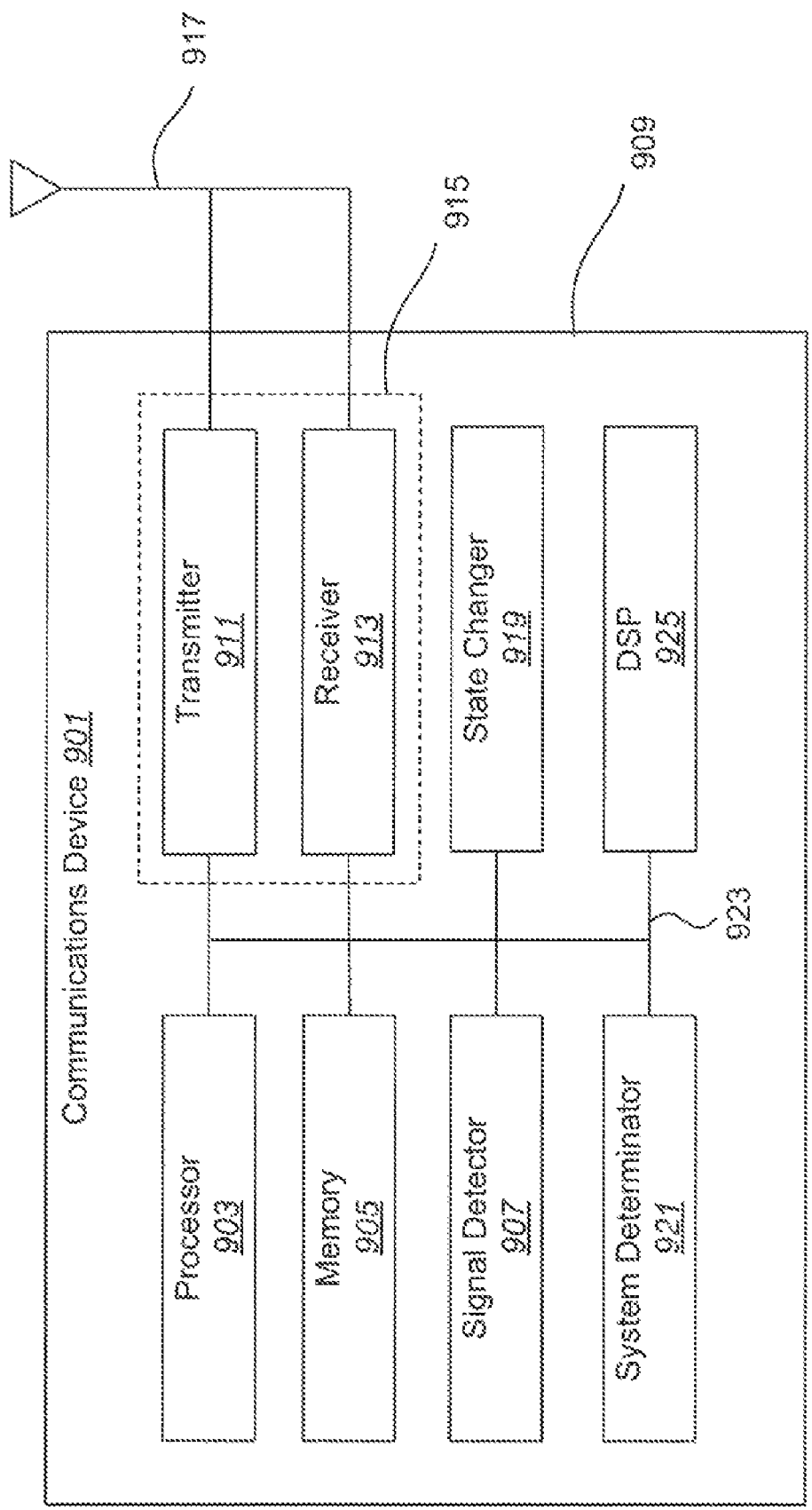
FIG. 9 illustrates various components that may be utilized in a communications device.

FIG. 9 illustrates various components that may be utilized in a communications device 901. The mobile station 302 in the system 300 of FIG. 3 is an example of a communications device 901, and it may include some or all of the components that are shown in FIG. 9.

The communications device 901 may include a processor 903 which controls operation of the device 901. The processor 903 may also be referred to as a CPU. Memory 905, which may include both read-only memory (ROM) and random access memory (RAM), provides instructions and data to the processor 903. A portion of the memory 905 may also include non-volatile random access memory (NVRAM).

The communications device 901 may also include a housing 909 that may include a transmitter 911 and a receiver 913 to allow transmission and reception of data between the communications device 901 and a remote location. The transmitter 911 and receiver 913 may be combined into a transceiver 915. An antenna 917 may be attached to the housing 909 and electrically coupled to the transceiver 915.

The communications device 901 may also include a signal detector 907 that may be used to detect and quantify the level of signals received by the transceiver 915. The signal detector 907 may detect such signals as total energy, pilot energy per pseudonoise (PN) chips, power spectral density, and other signals.

A state changer 919 of the communications device 901 may control the state of the communications device 901 based on a current state and additional signals received by the transceiver 915 and detected by the signal detector 907. The device 901 may be capable of operating in any one of a number of states. The communications device 901 may also include a system determinator 921 that may be used to control the device 901 and to determine which service provider system the device 901 should transfer to when it determines the current service provider system is inadequate.

The various components of the communications device 901 may be coupled together by a bus system 923 which may include a power bus, a control signal bus, and a status signal bus in addition to a data bus. However, for the sake of clarity, the various busses are illustrated in FIG. 9 as the bus system 923. The communications device 901 may also include a digital signal processor (DSP) 925 for use in processing signals.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules, circuits and algorithm steps described in connection with the embodiments disclosed herein may be implemented as electronic hardware, computer software or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as limiting the scope of the claims.

The various illustrative logical blocks, modules and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the embodiments disclosed herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the embodiment that is being described, the order and/or use of specific steps and/or actions may be modified without departing from the scope of the claims.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While specific embodiments have been illustrated and described, it is to be understood that the claims are not limited to the precise configuration and components illustrated above. Various modifications, changes and variations may be made in the arrangement, operation and details of the embodiments described above without departing from the scope of the claims.

What is claimed is:

1. A mobile station that is configured to facilitate coordination of supplementary services in a centralized fashion, comprising:
    circuit-switched domain components that are configured to place voice telephone calls in a circuit-switched domain; and
    Internet Protocol (IP) multimedia subsystem components that are configured to place voice telephone calls in an IP multimedia subsystem domain, the IP multimedia subsystem components comprising:
        a transport component for facilitating communication with an IP multimedia subsystem core network; and
        a signaling component that is configured to exchange information with a centralized server on the IP multimedia subsystem core network via the transport component;
    wherein:
        at least some of the information that is exchanged with the centralized server is related to supplementary services for the voice telephone calls in the circuit-switched domain as well as the voice telephone calls in the IP multimedia subsystem domain;
        the information is exchanged with the centralized server via at least one of a packet switched transport protocol, a data burst message protocol, a short message service protocol, a dual tone multi frequency protocol, and a dialed digits suffix protocol;
        exchanging information with the centralized server comprises sending a signaling message to the centralized server; and
        the signaling message comprises a service identifier field that identifies a supplementary service to be invoked, data that is specific to the invoked supplementary service, and a field that indicates continuation of dialogue to exchange further data that is specific to the invoked supplementary service,
    wherein:
    the transport component implements the dialed digits suffix protocol;
    communication with the centralized server occurs via the dialed digits suffix protocol; and
    communication with the centralized server via the dialed digits suffix protocol comprises appending encoded signaling as a suffix to dialed digits during call origination to the centralized server.

2. The mobile station of claim 1, wherein the mobile station is configured to:
    place a voice telephone call in the circuit-switched domain;
    invoke a supplementary service via the centralized server on the IP multimedia subsystem core network; and
    communicate with the centralized server to access and/or update the supplementary service while the voice telephone call is in the circuit-switched domain.

3. The mobile station of claim 2, wherein the mobile station is further configured to select a transport protocol and a signaling protocol that may be used to communicate with the centralized server, and wherein the selected transport protocol and the selected signaling protocol are used to invoke the supplementary service and to access and/or update the supplementary service.

4. The mobile station of claim 2, wherein the mobile station is further configured to:
    transfer the voice telephone call from the circuit-switched domain to the IP multimedia subsystem domain; and
    after the voice telephone call has been transferred to the IP multimedia subsystem domain, continue to communicate with the centralized server on the IP multimedia subsystem core network to access and/or update the supplementary service.

5. The mobile station of claim 1, wherein the mobile station is configured to:
    place a voice telephone call in the IP multimedia subsystem domain;
    invoke a supplementary service via the centralized server on the IP multimedia subsystem core network;
    transfer the voice telephone call from the IP multimedia subsystem domain to the circuit-switched domain; and after the voice telephone call has been transferred to the circuit-switched domain, continue to communicate with the centralized server on the IP multimedia subsystem core network to access and/or update the supplementary service.

6. The mobile station of claim 1, wherein the transport component implements the packet switched transport protocol, and wherein communication with the centralized server occurs via the packet switched transport protocol.

7. The mobile station of claim 1, wherein:
the transport component implements the data burst message protocol;
communication with the centralized server occurs via the data burst message protocol;
communication with the centralized server via the data burst message protocol comprises transmitting a data burst message to the centralized server;
the data burst message embeds an IP datagram;
a source address of the IP datagram corresponds to the mobile station; and
a destination address of the IP datagram corresponds to the centralized server.

8. The mobile station of claim 1, wherein:
the transport component implements the short message service protocol;
communication with the centralized server occurs via the short message service protocol;
communication with the centralized server via the short message service protocol comprises transmitting a special short message service message that receives preferential treatment while being routed in the IP multimedia subsystem core network; and
the special short message service message is not stored in the IP multimedia subsystem core network.

9. The mobile station of claim 1, wherein:
the transport component implements the dual tone multi frequency protocol;
communication with the centralized server occurs via the dual tone multi frequency protocol; and
communication with the centralized server via the dual tone multi frequency protocol comprises transmitting tones in band to a media gateway, which decodes the tones and passes them to the centralized server.

10. The mobile station of claim 1, further comprising an encoding/decoding component that is configured to:
encode information that is sent from the mobile station to the centralized server; and
decode information that is sent from the centralized server to the mobile station.

11. A centralized server that is part of an Internet Protocol (IP) multimedia subsystem core network and that is configured to coordinate supplementary services for voice telephone calls, comprising:
a transport component for facilitating communication with a mobile station when the mobile station is attached to an IP multimedia subsystem domain or to a circuit-switched domain; and
a signaling component that is configured to exchange information with the mobile station via the transport component;
wherein:
the information that is exchanged with the mobile station is related to supplementary services for voice telephone calls involving the mobile station when the mobile station is attached to the IP multimedia subsystem domain or to the circuit-switched domain;
the information is exchanged with the mobile station via at least one of a packet switched transport protocol, a data burst message protocol, a short message service protocol, a dual tone multi frequency protocol, and a dialed digits suffix protocol;
exchanging information with the mobile station comprises receiving a signaling message from the mobile station; and
the signaling message comprises a service identifier field that identifies a supplementary service to be invoked, data that is specific to the invoked supplementary service, and a field that indicates continuation of dialogue to exchange further data that is specific to the invoked supplementary service,
wherein:
the transport component implements the dialed digits suffix protocol;
communication with the centralized server occurs via the dialed digits suffix protocol; and
communication with the centralized server via the dialed digits suffix protocol comprises appending encoded signaling as a suffix to dialed digits during call origination to the centralized server.

12. The centralized server of claim 11, wherein the centralized server is further configured to store information about the supplementary services, the information comprising:
IP multimedia subsystem domain-related information which corresponds to the voice telephone calls in the IP multimedia subsystem domain; and
circuit-switched domain-related information which corresponds to the voice telephone calls in the circuit-switched domain.

13. A mobile station that is configured to facilitate coordination of supplementary services in a centralized fashion, comprising:
means for placing voice telephone calls in a circuit-switched domain;
means for placing voice telephone calls in an Internet Protocol (IP) multimedia subsystem domain; and
means for exchanging information with a centralized server on an IP multimedia subsystem core network;
wherein:
at least some of the information that is exchanged with the centralized server is related to supplementary services for the voice telephone calls in the circuit-switched domain as well as the voice telephone calls in the IP multimedia subsystem domain;
the information is exchanged with the centralized server via at least one of a packet switched transport protocol, a data burst message protocol, a short message service protocol, a dual tone multi frequency protocol, and a dialed digits suffix protocol;
exchanging information with the centralized server comprises sending a signaling message to the centralized server; and
the signaling message comprises a service identifier field that identifies a supplementary service to be invoked, data that is specific to the invoked supplementary service, and a field that indicates continuation of dialogue to exchange further data that is specific to the invoked supplementary service,
wherein:
the transport component implements the dialed digits suffix protocol;
communication with the centralized server occurs via the dialed digits suffix protocol; and communication with the centralized server via the dialed digits suffix protocol comprises appending encoded signaling as a suffix to dialed digits during call origination to the centralized server.

14. The mobile station of claim 13, further comprising:
means for invoking a supplementary service via the centralized server on the IP multimedia subsystem core network, the supplementary service corresponding to a voice telephone call in the circuit-switched domain; and
means for communicating with the centralized server to access and/or update the supplementary service while the voice telephone call is in the circuit-switched domain.

15. The mobile station of claim 14, further comprising means for selecting a transport protocol and a signaling protocol that may be used to communicate with the centralized server, and wherein the selected transport protocol and the selected signaling protocol are used to invoke the supplementary service and to access and/or update the supplementary service.

16. The mobile station of claim 14, further comprising:
means for transferring the voice telephone call from the circuit-switched domain to the IP multimedia subsystem domain; and
means for continuing to communicate with the centralized server on the IP multimedia subsystem core network to access and/or update the supplementary service after the voice telephone call has been transferred to the IP multimedia subsystem domain.

17. The mobile station of claim 13, further comprising:
means for placing a voice telephone call in the IP multimedia subsystem domain;
means for invoking a supplementary service via the centralized server on the IP multimedia subsystem core network;
means for transferring the voice telephone call from the IP multimedia subsystem domain to the circuit-switched domain; and
means for continuing to communicate with the centralized server on the IP multimedia subsystem core network to access and/or update the supplementary service after the voice telephone call has been transferred to the circuit-switched domain.

18. A computer program product, comprising:
a non-transitory computer-readable medium, comprising:
code for causing a mobile station to place voice telephone calls in a circuit-switched domain;
code for causing the mobile station to place voice telephone calls in an Internet Protocol (IP) multimedia subsystem domain; and
code for causing the mobile station to exchange information with a centralized server on an IP multimedia subsystem core network;
wherein:
at least some of the information that is exchanged with the centralized server is related to supplementary services for the voice telephone calls in the circuit-switched domain as well as the voice telephone calls in the IP multimedia subsystem domain;
the information is exchanged with the centralized server via at least one of a packet switched transport protocol, a data burst message protocol, a short message service protocol, a dual tone multi frequency protocol, and a dialed digits suffix protocol;
exchanging information with the centralized server comprises sending a signaling message to the centralized server; and
the signaling message comprises a service identifier field that identifies a supplementary service to be invoked, data that is specific to the invoked supplementary service, and a field that indicates continuation of dialogue to exchange further data that is specific to the invoked supplementary service,
wherein:
the transport component implements the dialed digits suffix protocol;
communication with the centralized server occurs via the dialed digits suffix protocol; and
communication with the centralized server via the dialed digits suffix protocol comprises appending encoded signaling as a suffix to dialed digits during call origination to the centralized server.

19. The computer program product of claim 18, further comprising:
code for causing the mobile station to invoke a supplementary service via the centralized server on the IP multimedia subsystem core network, the supplementary service corresponding to a voice telephone call in the circuit-switched domain; and
code for causing the mobile station to communicate with the centralized server to access and/or update the supplementary service while the voice telephone call is in the circuit-switched domain.

20. The computer program product of claim 19, further comprising code for causing the mobile station to select a transport protocol and a signaling protocol that may be used to communicate with the centralized server, wherein the selected transport protocol and the selected signaling protocol are used to invoke the supplementary service and to access and/or update the supplementary service.

21. The computer program product of claim 19, further comprising:
code for causing the mobile station to transfer the voice telephone call from the circuit-switched domain to the IP multimedia subsystem domain; and
code for causing the mobile station to continue to communicate with the centralized server on the IP multimedia subsystem core network to access and/or update the supplementary service after the voice telephone call has been transferred to the IP multimedia subsystem domain.

22. The computer program product of claim 18, further comprising:
code for causing the mobile station to place a voice telephone call in the IP multimedia subsystem domain;
code for causing the mobile station to invoke a supplementary service via the centralized server on the IP multimedia subsystem core network;
code for causing the mobile station to transfer the voice telephone call from the
IP multimedia subsystem domain to the circuit-switched domain; and
code for causing the mobile station to continue to communicate with the centralized server on the IP multimedia subsystem core network to access and/or update the supplementary service after the voice telephone call has been transferred to the circuit-switched domain.

23. A computer program product, comprising:
a non-transitory computer-readable medium, comprising:
code for causing a centralized server in an Internet Protocol (IP) multimedia system core network to facilitate communication with a mobile station when the mobile station is attached to an IP multimedia subsystem domain or to a circuit-switched domain; and code for causing the centralized server to exchange information with the mobile station, the information being related to supplementary services for voice telephone calls involving the mobile station when the mobile station is attached to the IP multimedia subsystem domain or to the circuit-switched domain;

wherein:
the information is exchanged with the mobile station via at least one of a packet switched transport protocol, a data burst message protocol, a short message service protocol, a dual tone multi frequency protocol, and a dialed digits suffix protocol;

exchanging information with the mobile station comprises receiving a signaling message from the mobile station; and the signaling message comprises a service identifier field that identifies a supplementary service to be invoked, data that is specific to the invoked supplementary service, and a field that indicates continuation of dialogue to exchange further data that is specific to the invoked supplementary service, wherein:
the transport component implements the dialed digits suffix protocol;
communication with the centralized server occurs via the dialed digits suffix protocol; and
communication with the centralized server via the dialed digits suffix protocol comprises appending encoded signaling as a suffix to dialed digits during call origination to the centralized server.

24. A method for facilitating coordination of supplementary services in a centralized fashion, comprising:
placing voice telephone calls in a circuit-switched domain;
placing voice telephone calls in an Internet Protocol (IP) multimedia subsystem domain; and
exchanging information with a centralized server on an IP multimedia subsystem core network, wherein:
at least some of the information that is exchanged with the centralized server is related to supplementary services for the voice telephone calls in the circuit-switched domain as well as the voice telephone calls in the IP multimedia subsystem domain;

the information is exchanged with the centralized server via at least one of a packet switched transport protocol, a data burst message protocol, a short message service protocol, a dual tone multi frequency protocol, and a dialed digits suffix protocol;

exchanging information with the centralized server comprises sending a signaling message to the centralized server; and the signaling message comprises a service identifier field that identifies a supplementary service to be invoked, data that is specific to the invoked supplementary service, and a field that indicates continuation of dialogue to exchange further data that is specific to the invoked supplementary service, wherein:
the transport component implements the dialed digits suffix protocol;
communication with the centralized server occurs via the dialed digits suffix protocol; and
communication with the centralized server via the dialed digits suffix protocol comprises appending encoded signaling as a suffix to dialed digits during call origination to the centralized server.

25. The method of claim 24, further comprising:
invoking a supplementary service via the centralized server on the IP multimedia subsystem core network, the supplementary service corresponding to a voice telephone call in the circuit-switched domain; and
communicating with the centralized server to access or update the supplementary service while the voice telephone call is in the circuit-switched domain.

26. The method of claim 25, further comprising:
transferring the voice telephone call from the circuit-switched domain to the IP multimedia subsystem domain; and
continuing to communicate with the centralized server on the IP multimedia subsystem core network to access or update the supplementary service after the voice telephone call has been transferred to the IP multimedia subsystem domain.

27. The method of claim 24, further comprising:
placing a voice telephone call in the IP multimedia subsystem domain;
invoking a supplementary service via the centralized server on the IP multimedia subsystem core network;
transferring the voice telephone call from the IP multimedia subsystem domain to the circuit-switched domain; and
continuing to communicate with the centralized server on the IP multimedia subsystem core network to access or update the supplementary service after the voice telephone call has been transferred to the circuit-switched domain.

* * * * *